United States Patent [19]
Takeuchi et al.

[11] Patent Number: 5,631,744
[45] Date of Patent: May 20, 1997

[54] CODING APPARATUS

[75] Inventors: Yoshitaka Takeuchi, Tokyo; Masahiko Enari, Yokohama, both of Japan

[73] Assignee: Canon Kabushiki Kaisha, Tokyo, Japan

[21] Appl. No.: 563,348

[22] Filed: Nov. 28, 1995

Related U.S. Application Data

[63] Continuation of Ser. No. 170,909, Dec. 21, 1993, abandoned.

[30] Foreign Application Priority Data

Dec. 28, 1992 [JP] Japan ................................. 4-360149

[51] Int. Cl.⁶ ................................................ H04N 1/415
[52] U.S. Cl. ................................. 358/432; 382/236
[58] Field of Search ............................. 358/426, 433, 358/432, 467, 539; 348/420, 421, 422; 382/232, 235, 236, 239, 251

[56] References Cited

U.S. PATENT DOCUMENTS

| | | | |
|---|---|---|---|
| 4,633,330 | 12/1986 | Yamamitsu et al. | 359/310 |
| 5,289,289 | 2/1994 | Nagasaki | 358/432 |
| 5,291,282 | 3/1994 | Nakagawa | 348/382 |

*Primary Examiner*—Michael T. Razavi
*Assistant Examiner*—Jerome Grant, II
*Attorney, Agent, or Firm*—Fitzpatrick, Cella, Harper & Scinto

[57] ABSTRACT

A coding apparatus includes a blocking unit for gathering and blocking sample values of input signals, an orthogonal-transforming unit for orthogonal-transforming the blocked input signals, a transforming unit for constructing a one-dimensionally arraying block by combining orthogonal-transformed blocks and for arranging the data in the one-dimensionally arraying block in a one-dimensional array, and a coding unit for coding the data of the one-dimensional array from the transforming unit.

15 Claims, 15 Drawing Sheets

FIG. 5

| $a_{00}$ | $a_{01}$ | $a_{02}$ | $a_{03}$ | $a_{04}$ |
|---|---|---|---|---|
| $a_{10}$ | $a_{11}$ | $a_{12}$ | $a_{13}$ | $a_{14}$ |
| $a_{20}$ | $a_{21}$ | $a_{22}$ | $a_{23}$ | $a_{24}$ |
| $a_{30}$ | $a_{31}$ | $a_{32}$ | $a_{33}$ | $a_{34}$ |

BLOCK A

| $b_{00}$ | $b_{01}$ | $b_{02}$ | $b_{03}$ | $b_{04}$ |
|---|---|---|---|---|
| $b_{10}$ | $b_{11}$ | $b_{12}$ | $b_{13}$ | $b_{14}$ |
| $b_{20}$ | $b_{21}$ | $b_{22}$ | $b_{23}$ | $b_{24}$ |
| $b_{30}$ | $b_{31}$ | $b_{32}$ | $b_{33}$ | $b_{34}$ |

BLOCK B

| $c_{00}$ | $c_{01}$ | $c_{02}$ | $c_{03}$ | $c_{04}$ |
|---|---|---|---|---|
| $c_{10}$ | $c_{11}$ | $c_{12}$ | $c_{13}$ | $c_{14}$ |
| $c_{20}$ | $c_{21}$ | $c_{22}$ | $c_{23}$ | $c_{24}$ |
| $c_{30}$ | $c_{31}$ | $c_{32}$ | $c_{33}$ | $c_{34}$ |

BLOCK C

| $d_{00}$ | $d_{01}$ | $d_{02}$ | $d_{03}$ | $d_{04}$ |
|---|---|---|---|---|
| $d_{10}$ | $d_{11}$ | $d_{12}$ | $d_{13}$ | $d_{14}$ |
| $d_{20}$ | $d_{21}$ | $d_{22}$ | $d_{23}$ | $d_{24}$ |
| $d_{30}$ | $d_{31}$ | $d_{32}$ | $d_{33}$ | $d_{34}$ |

BLOCK D

FIG. 10(A)

$a_{00}$ $b_{00}$ $c_{00}$ $d_{00}$    $a_{01}$ $b_{01}$ $c_{01}$ $d_{01}$    $a_{10}$ $b_{10}$ $c_{10}$ $d_{10}$ $\Delta a_{00}$ $\Delta b_{00}$ $\Delta c_{00}$    $\Delta a_{01}$ $\Delta b_{01}$ $\Delta c_{01}$    $\Delta a_{10}$ $\Delta c_{10}$ $\Delta d_{10}$

$a_{00}$ $\Delta a_{00}$ $\Delta b_{00}$ $\Delta c_{00}$, $a_{01}$ $\Delta a_{01}$ $\Delta b_{01}$ $\Delta c_{01}$, $a_{10}$ $\Delta a_{10}$ $\Delta c_{10}$ $\Delta d_{10}$ -----

$\Delta a_{00}$ $\Delta b_{00}$ $\Delta c_{00}$  $\Delta d_{00}$  $\Delta a_{01}$ $\Delta b_{01}$ $\Delta c_{01}$ $\Delta d_{01}$  $\Delta a_{10}$ $\Delta c_{10}$ $\Delta d_{10}$ -----

$a_{00}$ $\Delta a_{00}$ $\Delta b_{00}$ $\Delta c_{00}$ $\Delta d_{00}$ $\Delta a_{01}$ $\Delta b_{01}$ $\Delta c_{01}$ $\Delta d_{01}$ $\Delta a_{10}$ $\Delta c_{10}$ $\Delta d_{10}$ -----

CODING APPARATUS

This application is a continuation of application Ser. No. 08/710,909 filed Dec. 21, 1993, now abandoned.

BACKGROUND OF THE INVENTION

1. Field of the Invention

The present invention relates to a coding apparatus and, more particularly, to a coding apparatus that achieves high-efficiency coding, which is required for transmitting or recording information signals.

2. Description of the Related Art

High-efficiency coding is an important technique for digitizing image signals. High-efficiency coding can be achieved by, for example, orthogonal transformation which transforms time-sequentially input signals into orthogonal components (for example, frequency components). Examples of such orthogonal transformation are Fourier transformation, discrete cosine transformation (hereinafter, referred to as "DCT" or "DC transformation"), and Hadamard transformation. DCT is particularly suitable for high efficiency coding of image data.

A known high-efficiency coding method employing DCT will be described. FIG. 1 is a block diagram of a high-efficiency coding apparatus employing DCT.

An input digital signal from an input terminal 1 is inputted to a blocking circuit 2, which divides the signal into DCT-unit blocks. Then, a DCT circuit 3 transforms the blocked image signal into DCT coefficients, as shown in FIG. 2, by two-dimensional DCT using 64 pixels (8 horizontal pixels×8 vertical pixels), as shown in FIG. 2.

Such two-dimensional DCT is generally employed for high-efficiency coding of image signals.

The thus-obtained DCT coefficients are then quantized by a quantizing circuit 4. Then, a one-dimensional array circuit (zigzag scanning circuit) 5 rearranges the two-dimensional quantized data into a one-dimensional array by scanning in a zigzag manner the 64 pixels from the DC component pixel to the pixel of the highest vertical and horizontal frequency components as shown in FIG. 2.

Then, a variable-length coding circuit 6 transforms the one-dimensional array data into variable-length codes, which are then converted at a predetermined rate by a buffer memory 7 and are output from an output terminal 7.

Such variable-length coding is a scheme which assigns a codeword of a high incidence probability with a short code length, and a codeword of a low incidence probability with a long code length.

If all of the data following a significant coefficient in a block are zero, a code EOB (end of block) is assigned for that data, thereby omitting many zero coefficients occurring toward the end of each block.

In such a one-dimensional array scheme where quantized data in each DCT block is rearranged into a one-dimensional array, the distribution of electric power is relatively localized in low-frequency component in each block, but will vary to some extent from one block to another as indicated in FIG. 3(A).

Furthermore, each block contains an EOB code of, normally, 4 to 6 bits, and such codes can be redundant components which reduce the coding efficiency.

SUMMARY OF THE INVENTION

An object of the present invention is to provide a coding apparatus which eliminates the above-stated problems and thereby further enhances coding efficiency.

According to one aspect of the present invention, a coding apparatus comprises: blocking means for gathering and blocking sample values of input signals; orthogonal-transforming means for orthogonal-transforming input signals blocked by the blocking means; transforming means for constructing a one-dimensionally arraying block by combining a plurality of blocks orthogonal-transformed by the orthogonal-transforming means, and for arranging the data in the one-dimensionally arraying block in a one-dimensional array; and coding means for coding the data of the one-dimensional array from the transforming means.

Other objects, features and advantages of the present invention will become apparent from the following detailed description taken in conjunction with the appended drawings.

BRIEF DESCRIPTION OF THE DRAWINGS

FIG. 5 illustrates blocks in which components are converted into character constants for one-dimensional arrangement according to the first embodiment.

FIGS. 10(A) and 10(B) illustrate DPCM (differential pulse code modulation) of the quantization coefficients aligned in an one-dimensional array.

DETAILED DESCRIPTION OF THE PREFERRED EMBODIMENTS

A first embodiment of a coding apparatus of the invention will be described in detail.

Figure 4:
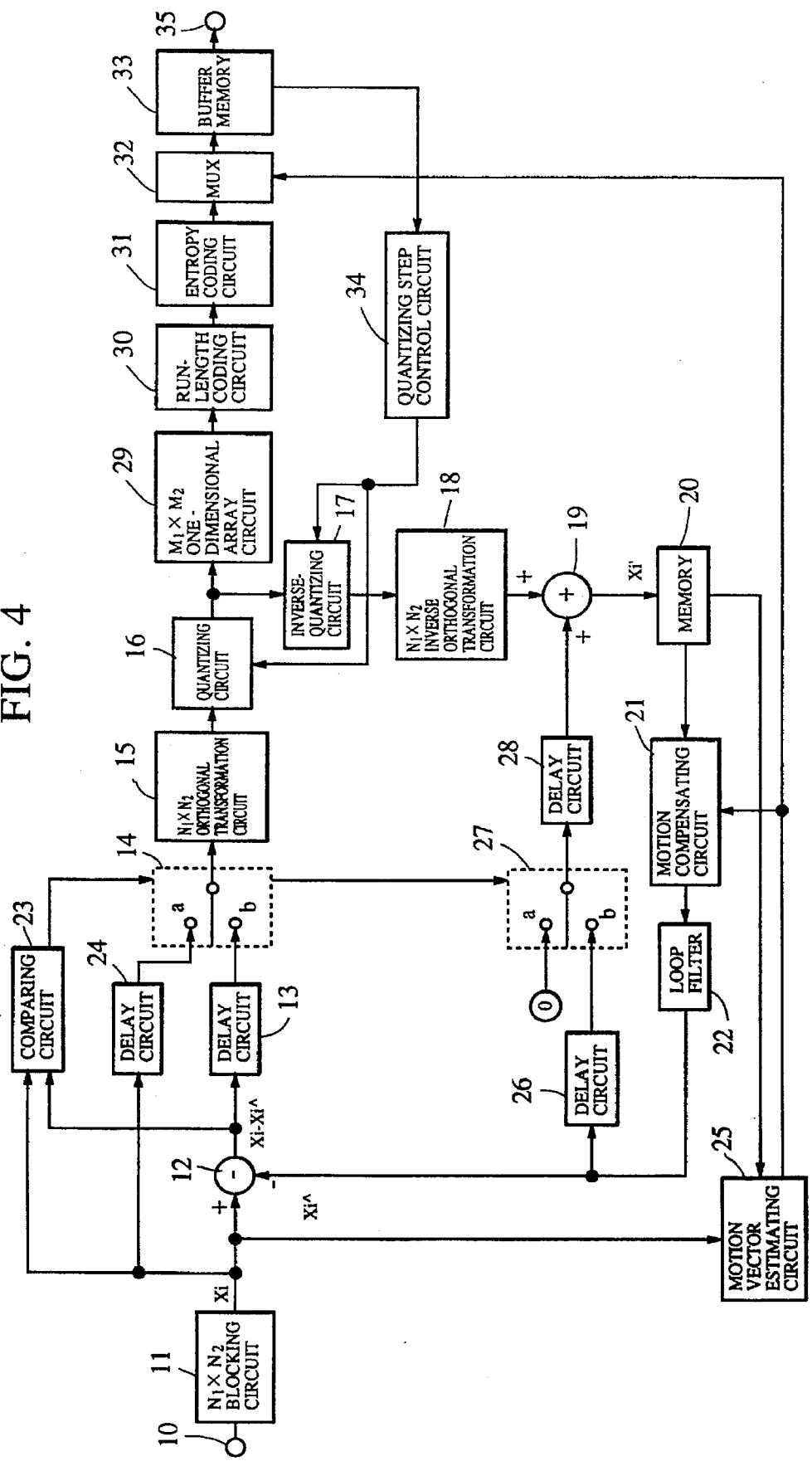
FIGS. 4A and 4B taken together are a block diagram of a first embodiment of a coding apparatus of the present invention.
Figure 4A:
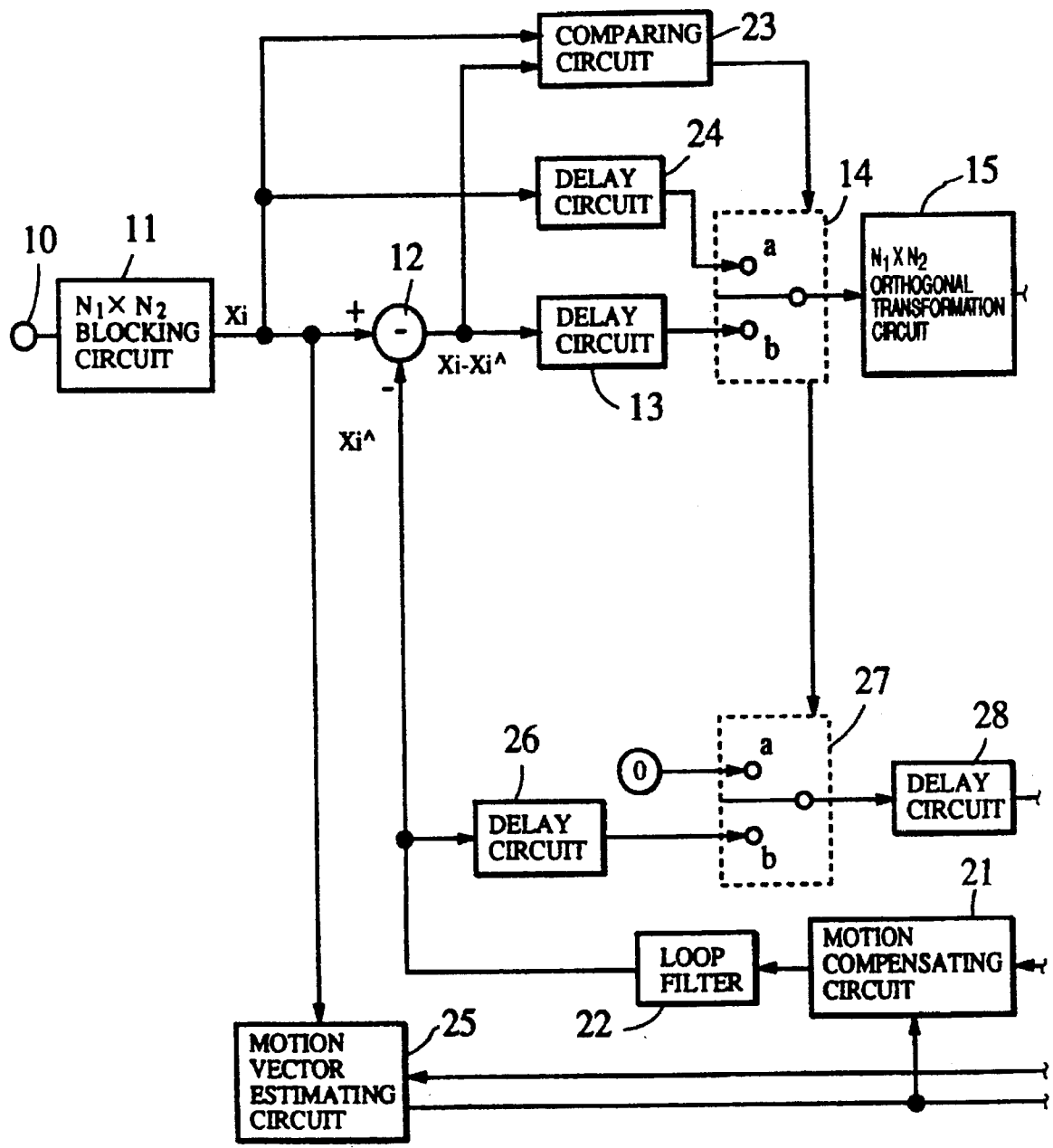
Figure 4B:
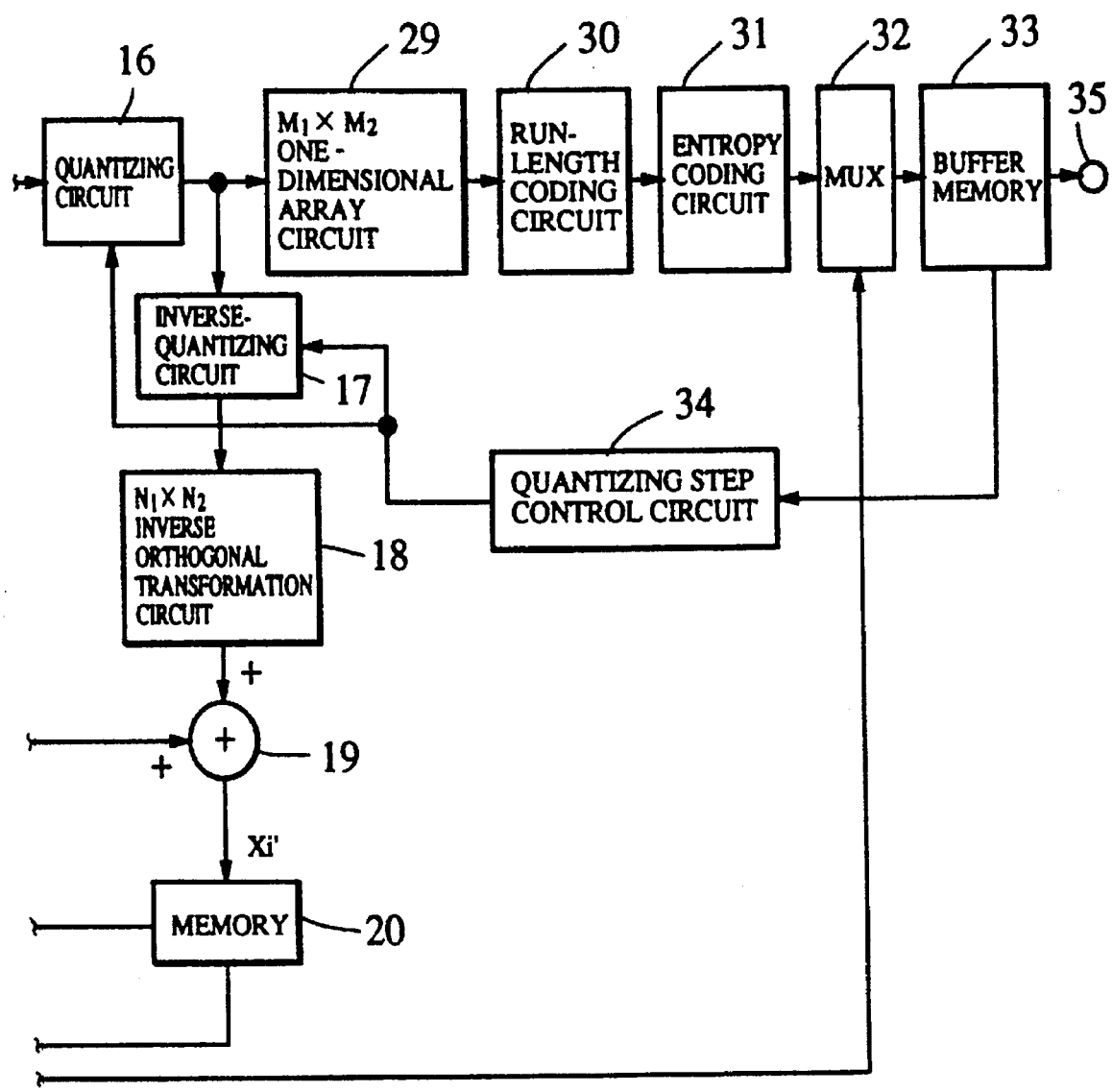

Referring to FIGS. 4A and 4B, an $N_1 \times N_2$ blocking circuit 11 transforms image data input from an input terminal 10 into two-dimensional data in an orthogonal-transformed block having ($N_1 \times N_2$) pixels ($N_1$ pixels horizontally×$N_2$ pixels vertically).

The two-dimensionally transformed image data Xi (hereinafter, referred to as "in-frame signal") is output to a difference computing circuit 12, a comparing circuit 23 and a delay circuit 24.

The delay circuit 24 delays the timing of outputting the in-frame signal Xi to a terminal a of a switch 14, by the amount of time required for processing by the comparing circuit 23.

The difference computing circuit 12 determines the difference Xi–Xi^ (hereinafter, referred to as "inter-frame difference signal") between the image data Xi and the image data Xi^ of the previous image data, the previous image data Xi^ having been predicted by a motion compensating circuit 21 and processed by the two-dimensional low-pass filtering of the loop filter 22. The inter-frame difference signal Xi–Xi^ is output to a delay circuit 13 and the comparing circuit 23.

The delay circuit 13 delays the timing of outputting of the inter-frame difference signal Xi–Xi^ to a terminal b of the switch 14, by the amount of time required for processing by the comparing circuit 23.

The comparing circuit 23 compares the data amount of the in-frame signals Xi with the data amount of the inter-frame difference signal Xi–Xi^, and controls the operation of the switches 14 and 27 based on the result of the comparison.

The processing of the comparing circuit 23 will now be specifically described.

If the result of the comparison is:

*Xi<Xi–Xi^* the comparing circuit 23 connects the terminal a of each of switches 14 and 27 to perform in-frame compression. If the result of the comparison is:

*Xi≧Xi–Xi^* the comparing circuit 23 connects the terminal b of each of the switches 14 and 27.

The comparing circuit 23 compares the data amounts in individual macroblocks. A macroblock is composed of a plurality of orthogonal-transformed blocks (each containing ($N_1 \times N_2$) pixels in this embodiment). To prevent error propagation, the comparing circuit 23 controls switches 14 and 27 so that compulsory in-frame compression will be performed every predetermined number of macroblocks.

Either the in-frame signal Xi or the inter-frame difference signal Xi–Xi^ that is selected by the switch 14 is then orthogonal-transformed by the (N1×N2) orthogonal transformation circuit 15 (for example, a DCT circuit).

The transformed coefficients from the ($N_1 \times N_2$) orthogonal transformation circuit 15 are then quantized by a quantizing circuit 16. The quantized data are input to an inverse-quantizing circuit 17 and to an ($M_1 \times M_2$) one-dimensional array circuit 29.

The inverse-quantizing circuit 17 inverse-quantizes the quantized data and outputs the data to an ($N_1 \times N_2$) inverse orthogonal transformation circuit 18.

The ($N_1 \times N_2$) inverse orthogonal transformation circuit 18 transforms the transformed coefficients into an in-frame signal X1' or an inter-frame difference signal (Xi–Xi^)' and outputs the signal to an adding circuit 19.

The adding circuit 19 adds the in-frame signal X1' or the inter-frame difference signal (Xi–Xi^)' to the value 0 or to a predicted value Xi^ which has been delayed by a delay circuit 28 by the amount of time required for the processings of the ($N_1 \times N_2$) orthogonal transformation circuit 15, the quantizing circuit 16, the inverse-quantizing circuit 17 and the ($N_1 \times N_2$) inverse orthogonal transformation circuit 18. The total value is input to a memory 20.

The output Xi' from the adding circuit 19, called a local decoded value, is decoded image data.

The local decoded value Xi' is stored in the memory 20 as predicted data which has been delayed by an amount of time equivalent to one frame.

A motion vector computing circuit 25 computes the motion vector of a coding block by comparing the image data Xi with the image data Xi' of the previous frame stored in the memory 20. A motion vector is detected in each macroblock.

The motion compensating circuit 21 motion-compensates the image data Xi' of the previous frame by using the motion vector determined by the motion vector computing circuit 25, and outputs compensation data.

The loop filter 22 processes a motion-compensated coding block on the basis of two-dimensional low-pass filtering, and outputs a predicted data Xi^.

The predicted data Xi^ is input to the delay circuit 26 and the difference computing circuit 12.

The delay circuit 26 delays the predicted data Xi^ by the amount of time required for processing by the comparing circuit 23, and then outputs the data to terminal b of switch 27. Terminal a of switch 27 is preset to the value 0 which is added to the in-frame signal X1' or to the inter-frame difference signal (Xi–Xi^ )' by adding circuit 19.

The ($M_1 \times M_2$) one-dimensional array circuit 29 arranges the data of an in-frame coding block or an inter-frame coding block into a one-dimensional array.

The one-dimensional arrangement method is one of the features of the present invention. In a conventional method, two-dimensional block data is arranged into a one-dimensional array in units of orthogonal-transformed blocks. In a method according to this embodiment, two-dimensional block data is arranged into a one-dimensional array by extracting the data from a two-dimensional block composed of a plurality of orthogonal-transformed blocks, that is, a two-dimensional block containing an integer ($M_1$) times horizontal pixels ($N_1$)×an integer ($M_2$) times vertical pixels ($N_2$). Such a two-dimensional block is called a one-dimensionally arraying block.

The one-dimensional arrangement method of this embodiment will be further described on the assumption that a one-dimensionally arraying block is composed of four orthogonal-transformed blocks. The orthogonal transformation coefficients of each block are defined as shown in FIG. 5.

The data of the orthogonal-transformed blocks of a one-dimensionally arraying block are one-dimensionally arranged by sequentially extracting the coefficients in such a manner that one coefficient at a time is picked up from each of the orthogonal-transformed blocks, and putting them in a one-dimensional array, for example, as follows.

ARRAY EXAMPLE 1

<u>A00 B00 C00 D00</u>, <u>A10 B10 C10 D10</u>,
<u>A01 B01 C01 D01</u>, <u>A+b 11 B+b 11</u> •••

The sequence of the underlined groups of four coefficients can be changed as long as one coefficient at a time is extracted from each orthogonal-transformed block so that the four coefficients in each group have the same subscript number (that is, the same frequency component) and so that the sequence of the blocks in each group (that is, extraction sequence) follows a certain rule (in the above example, block A→block B→block C → block D).

Because the orthogonal-transformed blocks of a one-dimensionally arraying block are adjacent to each other in a very small area of an image, the same components of the orthogonal-transformed blocks have amplitudes very close to each other after having been orthogonal-transformed and quantized. As stated in "Description of the Related Art", the distribution of the power of coefficients tends to localize in low-frequency components due to the statistic characteristics of images.

Figure 1:
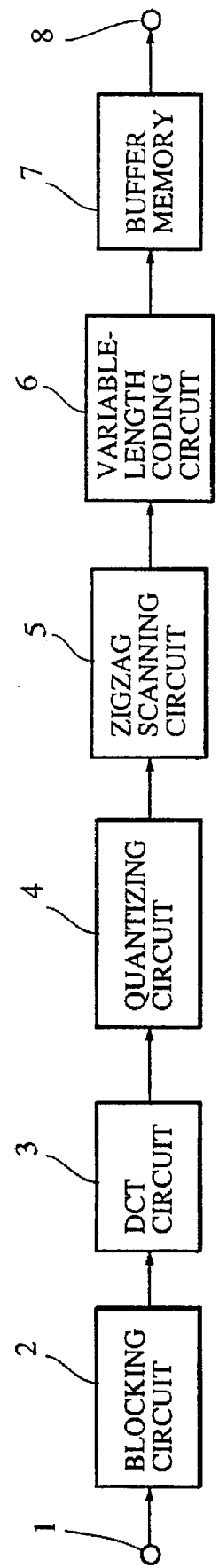
FIG. 1 is a block diagram of a conventional coding apparatus.
Figure 2:
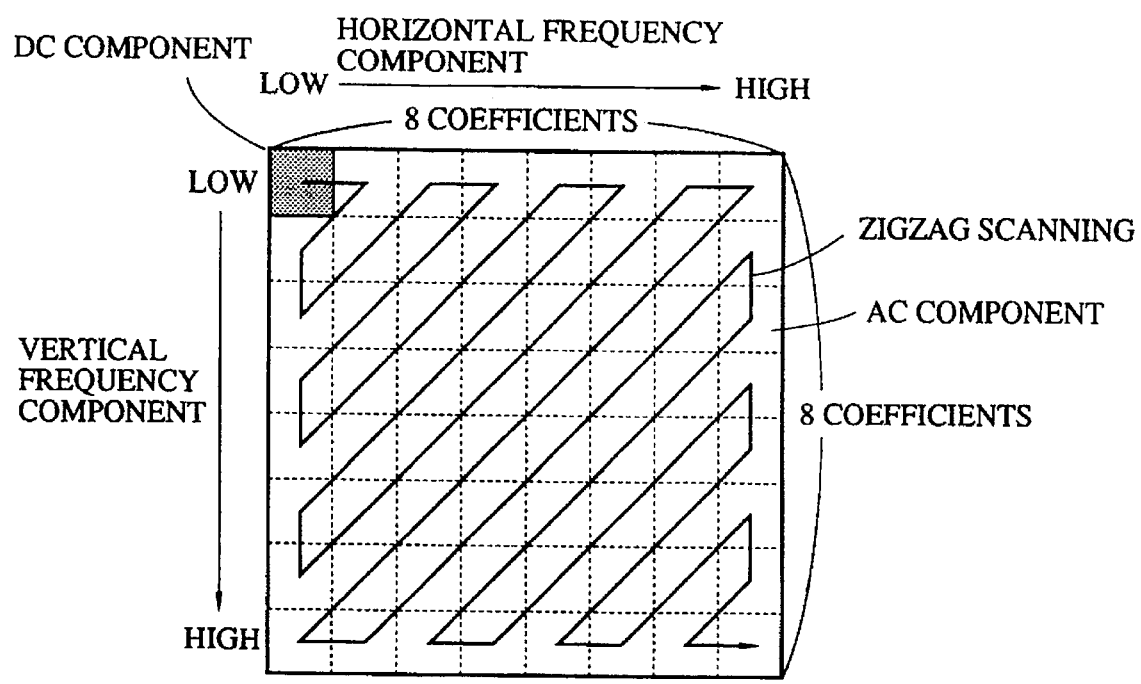
FIG. 2 illustrates DCT coefficients and zigzag scanning.
Figure 3:
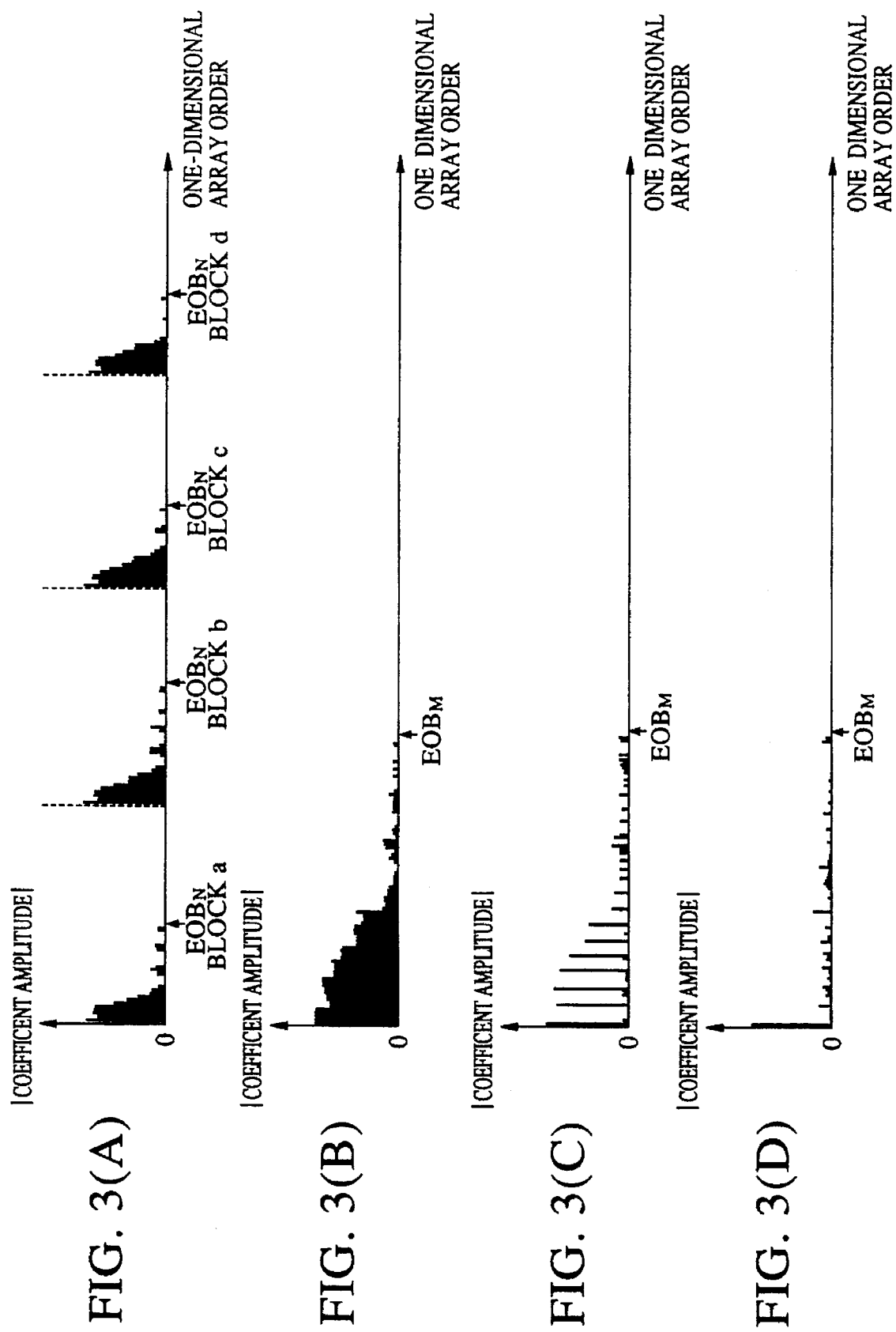
FIGS. 3(A) to 3(D) indicate the power distribution of coefficients arranged from blocks into one-dimensional arrays.

Utilizing these characteristics, the two-dimensional block data is arranged into a one-dimensional array in order from the lowest to the highest frequency. In such a manner, the power distribution in a block for one dimensional arrangement can be substantially converged as indicated in FIG. 3(B).

In addition, the extraction sequence, that is, the sequence of the four coefficients in each group, can be different from that indicated in Array Example 1, as long as one coefficient at a time is extracted from each orthogonal-transformed block so that the four coefficients in each group are from the corresponding frequency components in the orthogonal-transformed blocks and so that the extraction sequence follows a certain rule.

Figure 6A:
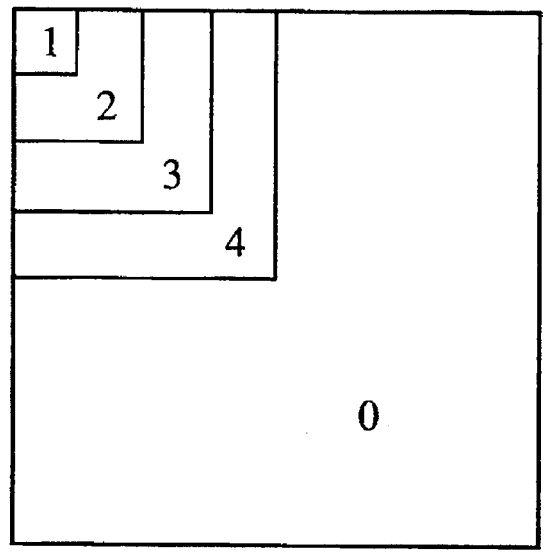
FIGS. 6(A) and 6(B) illustrate an example of the division of each block.
Figure 6B:
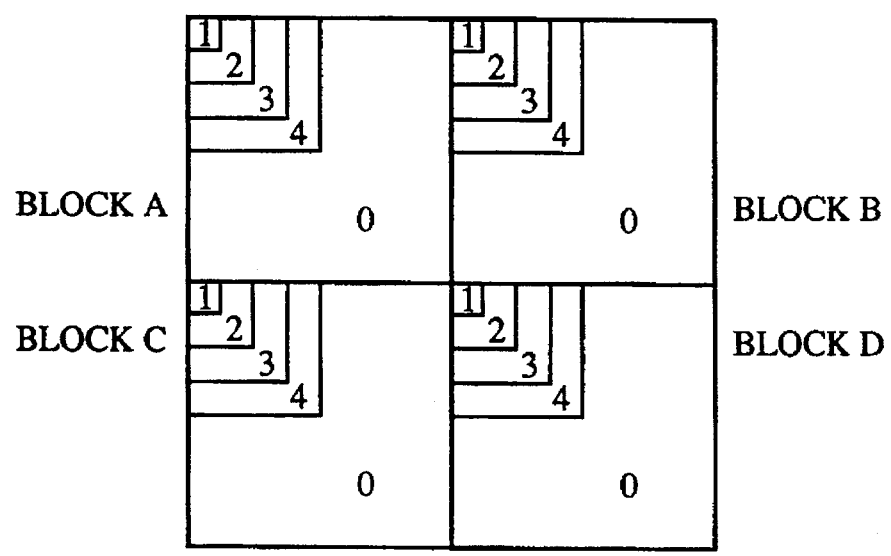

As shown in FIGS. 6(A) and 6(B), an area of each orthogonal-transformed block containing significant coefficients may be divided into several regions according to the frequency components. The regions are assigned with serial numbers in ascending order from the lowest-frequency region to the highest-frequency region.

Figure 7A:
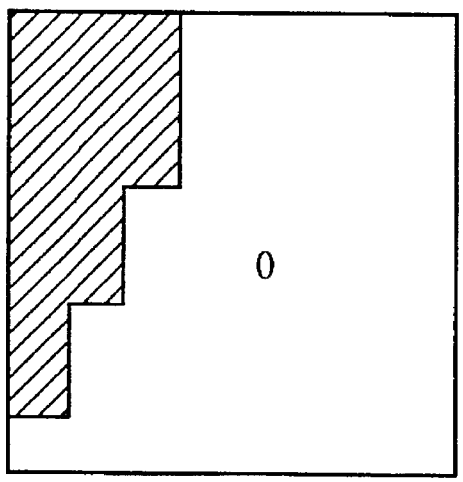
FIGS. 7(A) to (D) illustrate various divisions of blocks in accordance with the power distribution of coefficients.
Figure 7B:
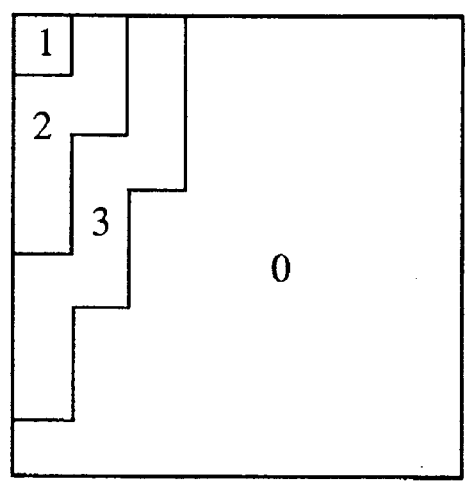
Figure 7C:
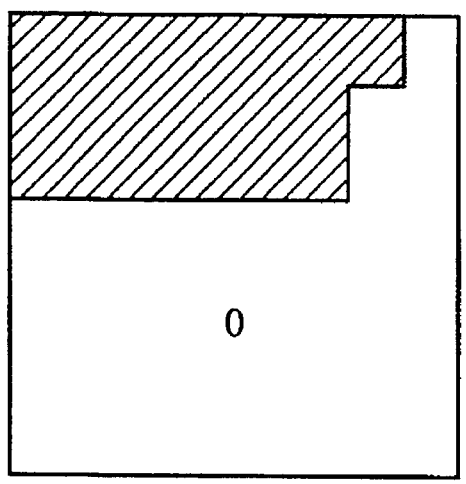
Figure 7D:
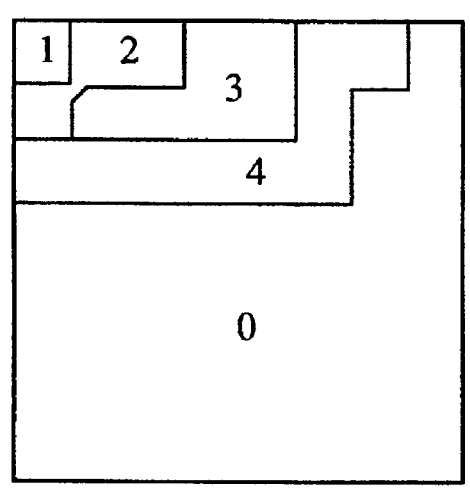

If the coefficients' power distribution in each orthogonal-transformed block is biased to vertical or horizontal frequency components as shown in FIGS. 7(A) or 7(C), each block is preferably divided into regions in accordance with such biased distribution, as shown in FIGS. 7(B) or 7(D).

The two-dimensionally arranged coefficients in the blocks are one-dimensionally arranged in the ascending order of the serial numbers of the regions by sequentially extracting the coefficients in such a manner that one coefficient at a time is picked up from each of the orthogonal-transformed blocks, and putting them in a one-dimensional array, for example, as follows.

ARRAY EXAMPLE 2

A00 B00 C00 D00,   A01 B01 C01 D01 A10 B10 C10 D10 A11 B11 C11 D11, region 1                     region 2

A02 B02 C02 D02 A20 B20 C20 D20 A12 B12 ...

region 3

Furthermore, the sequence of the coefficients in each region may be different from that indicated in Array Example 2, as long as the sequences of the regions follow a certain rule. For example, coefficients may be aligned in units of blocks as follows.

ARRAY EXAMPLE 3

A00 B00 C00 D00,   A01 A11 A10 B01 B11 B10 D01 D11 D10 C01 C11 C10, region 1                     region 2

A02 A12 A22 A21 A20 B02 B12 B22 B21 B20 D02 D12 ...

region 3

Figure 8A:
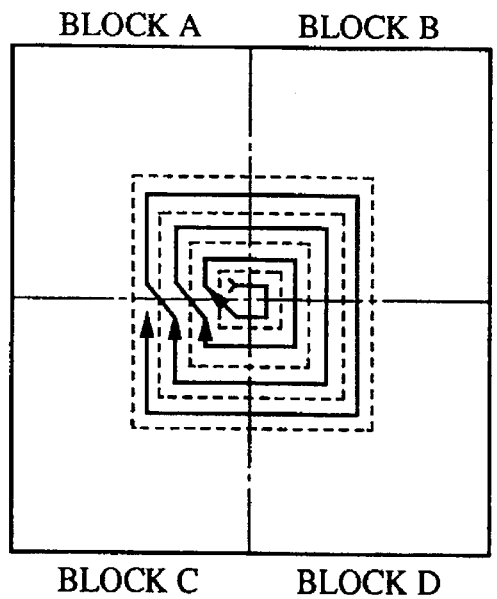
FIGS. 8(A) and 8(B) illustrate tornado scanning.
Figure 8B:
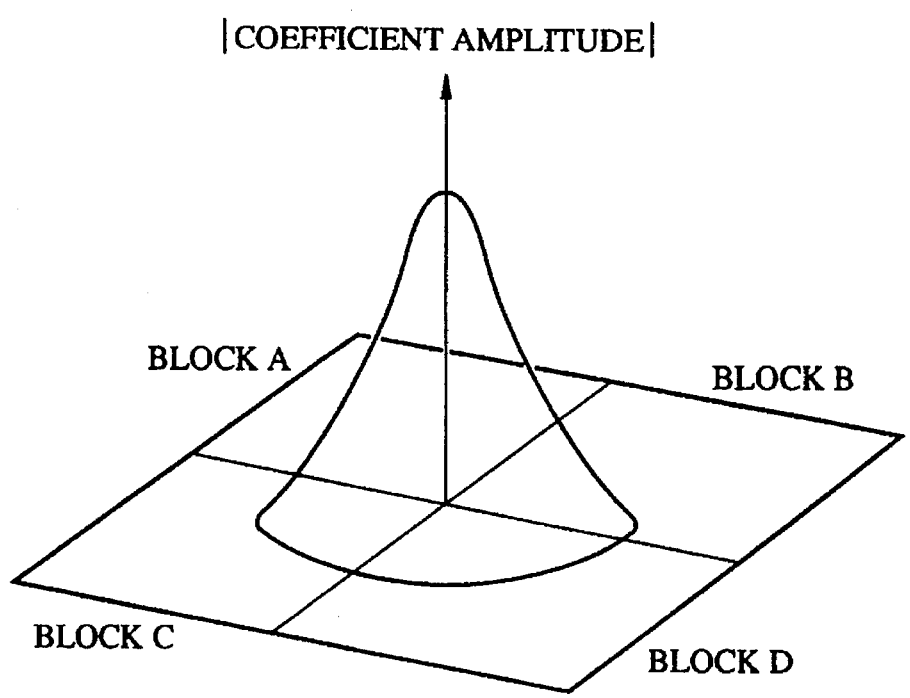

This arrangement is geometrically achieved as follows. Orthogonal-transformed blocks A, B and C are rotated by 180°, 90° and −90°, respectively, to achieve a one-dimensionally arraying block as shown in FIG. 8(A), thereby converging the power distribution at the center thereof as indicated in FIG. 8(B). Then, the coefficients are extracted in a spiral manner from the center toward the periphery as indicated in FIG. 8(A). This is called a tornado scanning scheme. In this scheme, the coefficients' power distribution in a one-dimensional array also becomes as indicated in FIG. 3(B).

FIG. 3(B) indicates that after the orthogonal transformation coefficients have been quantized, many small values, which mostly occur in the high frequency regions, are reduced to zero. $EOB_M$ (end of block M1*M2 is provided following the last significant coefficient in the one-dimensional array.

As understood from the above description, the coding efficiency is enhanced by performing coding at a time in a one-dimensionally arraying block composed of a plurality of orthogonal-transformed blocks, whereas in a conventional coding scheme, coding is performed for each orthogonal-transformed block.

The thus-arrayed coefficients are input to a run-length coding circuit 30, which combines the value 0 and a value other than 0 into a pair and outputs the pair to an entropy coding circuit 31.

The entropy coding circuit 31 assigns a run-length code of a high incidence with a short code, and a run-length code of a low incidence with a long code, thus reducing the amount of data. The reduced data is outputted to a multiplexing circuit 32.

The multiplexing circuit 32 codes a motion vector from the motion vector computing circuit 25, and multiplexes the thus-coded signal and the signal from the entropy coding circuit 31, and outputs the multiplexed signal to a buffer memory 33.

The buffer memory 33 temporarily stores the coded data and outputs the data from an output terminal 35 at a predetermined transmission rate.

In this embodiment, when the amount of data stored in the buffer memory 33 is larger than a predetermined amount, a quantizing step control circuit 34 controls the quantizing step of the quantizing circuit 16 so that the amount of data stored therein is reduced to the predetermined amount.

When the amount of data stored in the buffer memory 33 is smaller than a predetermined amount, the quantizing step control circuit 34 controls the quantizing step of the quan-tizing circuit 16 so that the amount of data stored is increased to the predetermined amount.

The inverse-quantizing circuit 17 is also controlled in a similar manner.

A second embodiment of the coding apparatus of the invention will be described in detail hereinafter.

Figure 9:
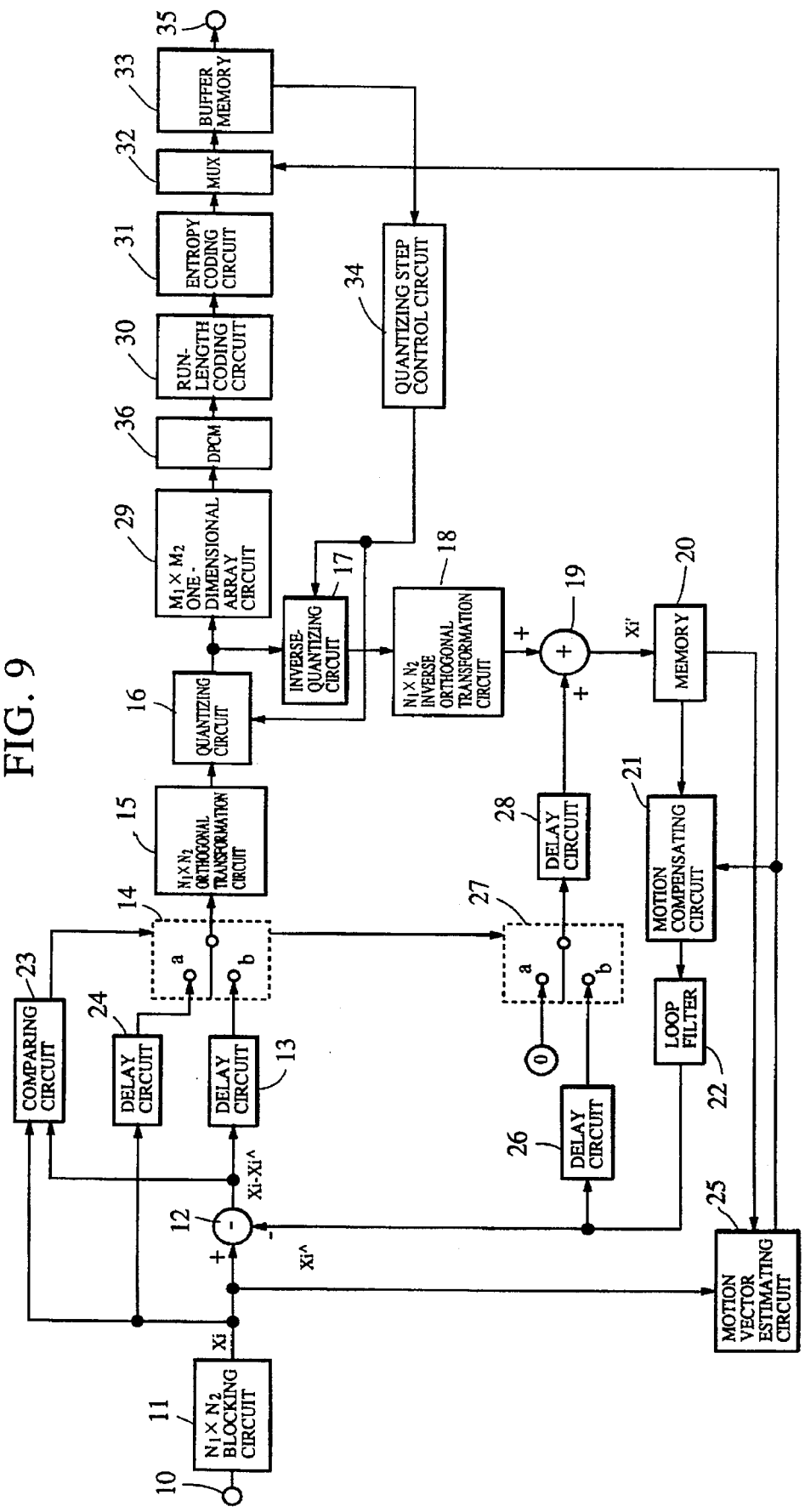
FIGS. 9A and 9B taken together are a block diagram of a second embodiment of a coding apparatus of the present invention.
Figure 9A:
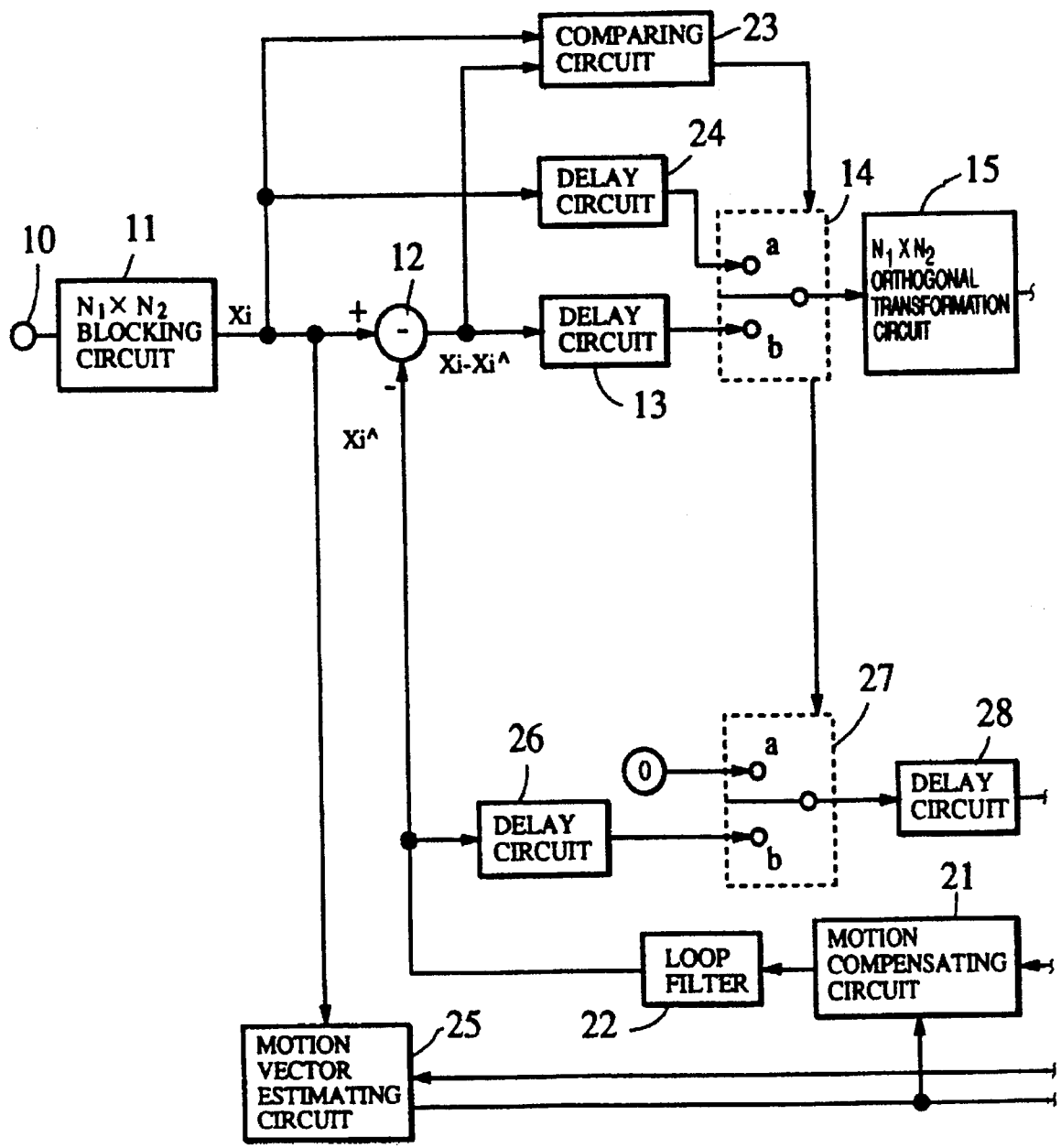
Figure 9B:
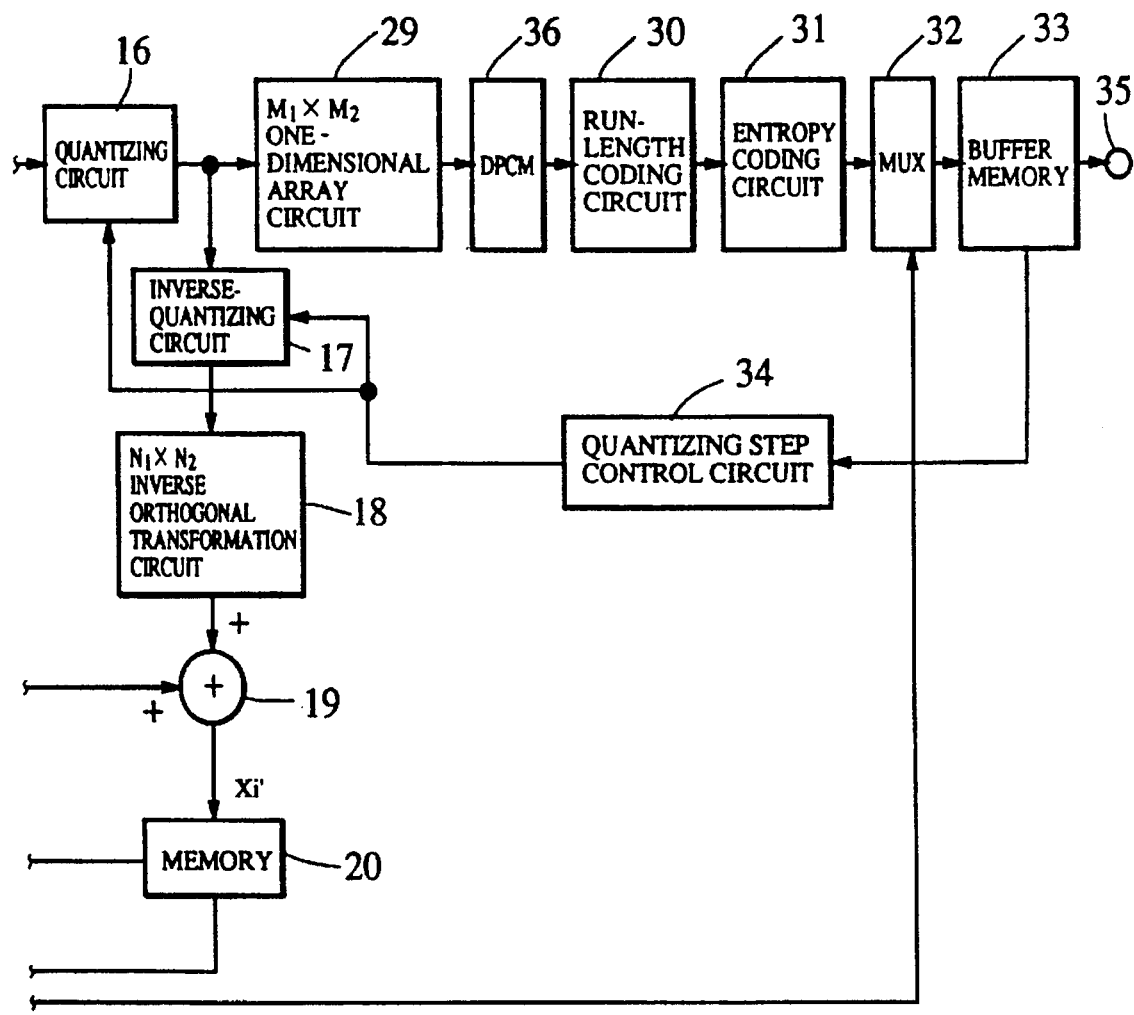

FIGS. 9A and 9B are a block diagram of the second embodiment. Components comparable to those in FIGS. 4A and 4B are denoted in the same numerals as those referred in FIGS. 9A and 9B, and will not be described again.

The second embodiment is similar to the first embodiment, but further comprises a DPCM (differential pulse code modulation) predictive coding circuit 36 provided between the M1×M2 one-dimensional array circuit 29 and the run-length coding circuit 30.

The DPCM predictive coding circuit 36 performs DPCM predictive coding of one-dimensionally arranged coefficients having the same frequency components, and expresses the coefficients by the differences therebetween, as indicated in FIG. 10(A). The coefficients' power distribution is therefore changed from a pattern as shown in FIG. 3(B) to a pattern as shown in FIG. 3(C), thus enhancing the coding efficiency. The entropy coding performed later further enhances the coding efficiency.

If DPCM predictive coding is also performed between coefficients in neighboring regions as indicated in FIG. 10(B), the coefficients' power distribution is changed from the pattern shown in FIG. 3(C) to a pattern shown in FIG. 3(D), thus further enhancing the coding efficiency and facilitating the production of an apparatus for achieving such high-efficiency coding scheme.

Figure 11:
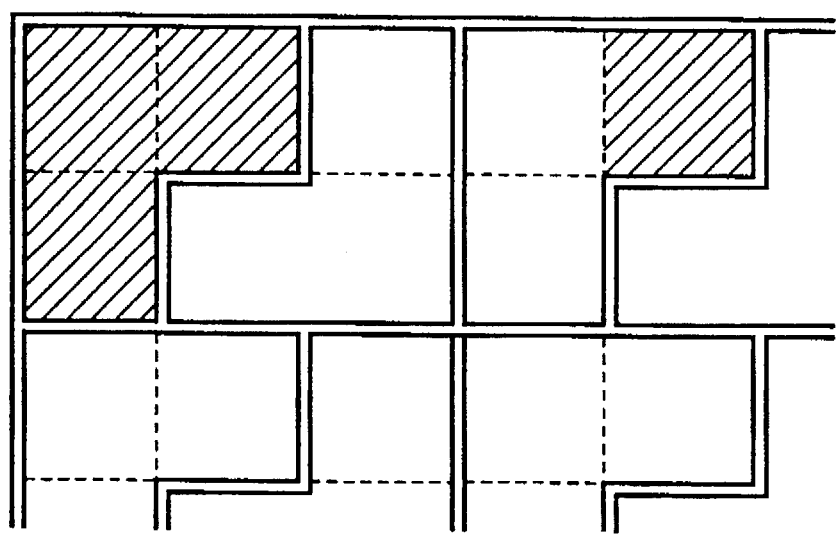
FIG. 11 illustrates an alternate shape of a one-dimensionally arraying block.

Although the above embodiments are described in connection with a square or rectangular one-dimensionally-array block having an integer (M1) times horizontal pixels (N1)×an integer (M2) times vertical pixels (N2), the one-dimensionally arraying block may have other shapes, for example, such as the shape shown in FIG. 11.

In addition, inter-field or inter-frame coding often employs a motion detecting and compensating technique to enhance the coding efficiency. In such a case, although it would be best to perform coding for each orthogonal-transformed block, it is normal practice to perform coding for a macroblock composed of a plurality of orthogonal-transformed blocks. Such a macroblock can also be handled as a one-dimensionally arraying block.

As described above, a coding apparatus in accordance with the invention achieves a one-dimensional array of coefficients on the basis of a one-dimensionally arraying block composed of a plurality of orthogonal-transformed blocks whereas a conventional coding apparatus achieves a one-dimensional array of coefficients on the basis of each orthogonal-transformed block. Therefore, according to the present invention, the distribution of the orthogonal transformation coefficients can be converged, which varies from an orthogonal-transformed block to another. Further, the coding apparatus of the invention requires only one EOB code for a plurality of orthogonal-transformed blocks whereas a conventional coding apparatus requires one EOB code for each block. The coding efficiency can be thus enhanced according to the invention.

The present invention can be embodied in other various manners without departing from the scope of the invention.

For example, although the above embodiments are described in connection with DCT, other types of rectangular transformation may be employed. Although the above-described embodiments selectively performs in-frame coding and inter-frame coding, the coding apparatus of the present invention may also selectively perform in-field coding and inter-frame coding.

In other words, the foregoing description of embodiments has been given for illustrative purposes only and is not to be construed as imposing any limitation in every respect.

The scope of the invention is, therefore, to be determined solely by the following claims and is not limited by the text of the specification.

What is claimed is:

1. A coding apparatus comprising:
   blocking means for gathering and blocking sample values of input signals;
   output means for selectively outputting data, in a first output mode for outputting a difference signal obtained by subtracting a predicted value from an input signal blocked by said blocking means, and, in a second mode for outputting an input signal blocked by said blocking means, without using the difference signal;
   orthogonal-transforming means for orthogonal-transforming data from said output means;
   transforming means for constructing a two-dimensionally arraying block by combining a plurality of blocks orthogonal-transformed by said orthogonal-transforming means, and for transforming the data of the two-dimensionally arraying block into a one-dimensional array; and
   coding means for coding the data of the one-dimensional array.

2. A coding apparatus according to claim 1, wherein said transforming means achieves the one-dimensional data array by sequentially selecting data in each of the blocks constituting the two-dimensionally arraying block in order from a low frequency side to a high frequency side.

3. A coding apparatus according to claim 1, wherein said transforming means includes quantizing means for quantizing orthogonal-transformed data.

4. A coding apparatus according to claim 1, wherein said coding means includes means for performing DPCM coding.

5. A coding apparatus according to claim 1, wherein said orthogonal-transforming means includes means for performing discrete cosine transformation.

6. A coding apparatus according to claim 1, wherein said transforming means achieves the one-dimensional data array by dividing each of the blocks constituting the two-dimensionally arraying block into regions, and by sequentially selecting data from each of the regions of each of the blocks.

7. A coding apparatus according to claim 6, wherein said transforming means achieves the one-dimensional data array by sequentially selecting data in each of the blocks constituting the two-dimensionally arraying blocks in order from a low frequency side to a high frequency side.

8. An image coding apparatus comprising:
   a) blocking means for blocking image data;
   b) orthogonal-transforming means for orthogonal-transforming image data blocked by said blocking means;
   c) outputting means for gathering a predetermined number of the orthogonal-transformed data blocks within one picture, and for outputting the orthogonal-transformed data of the gathered data blocks, wherein said outputting means outputs the orthogonal-transformed data so as to disperse the orthogonal-transformed data of each of the gathered data blocks; and
   coding means for coding the orthogonal-transfored data output by said outputting means.

9. An image coding apparatus according to claim 8, wherein said outputting means outputs the orthogonal-transformed data by dividing each of the gathered data blocks in order from a low frequency side to a high frequency side.

10. An image coding apparatus according to claim 8, wherein said orthogonal-transforming means includes means for performing discrete cosine transformation.

11. An image coding apparatus according to claim 8, further comprising:

a buffer memory for temporarily storing data coded by said coding means; and control means for controlling a quantizing step of said quantizing means in accordance with a data storage status of said buffer memory.

12. An image coding apparatus according to claim 8, wherein said outputting means outputs the orthogonal-transformed data by dividing each of the gathered data blocks into regions, and by sequentially selecting data from each of the regions of each of the blocks.

13. An image coding apparatus according to claim 12, wherein said outputting means outputs the orthogonal-transformed data by sequentially selecting data in each of the gathered data blocks in order from a low frequency side to a high frequency side.

14. An image coding apparatus according to claim 8, wherein said transforming means includes quantizing means for quantizing orthogonal-transformed data.

15. An image coding apparatus according to claim 14, wherein said coding means includes means for performing DPCM coding.

* * * * *

UNITED STATES PATENT AND TRADEMARK OFFICE
CERTIFICATE OF CORRECTION

PATENT NO. : 5,631,744

DATED : May 20, 1997

INVENTORS : YOSHITAKA TAKEUCHI ET AL.

It is certified that error appears in the above-identified patent and that said Letters Patent is hereby corrected as shown below:

COLUMN 1

Line 57, "component" should read --components--.

COLUMN 2

Line 37, "9A and 9B" should read --9(A) and 9(B)--;
   Line 43, "an" should read --a--;
   Line 51, "4A and 4B" should read --4(A) and 4(B)--.

COLUMN 4

Line 46, "A+b 11 B+b 11•••" should read --$A_{11}B_{11}C_{11}D_{11}$•••--.

COLUMN 6

Line 4, "*M2" should read --M2--;
   Line 64, "9A and 9B" should read --9(A) and 9(B)--;
   Line 65, "4A" should read --4(A)--;
   Line 66, "4B" should read --4(B)--;
   Line 67, "9A and 9B" should read --9(A) and 9(B)--.

UNITED STATES PATENT AND TRADEMARK OFFICE
CERTIFICATE OF CORRECTION

PATENT NO. : 5,631,744

DATED : May 20, 1997

INVENTORS : YOSHITAKA TAKEUCHI ET AL.

It is certified that error appears in the above-identified patent and that said Letters Patent is hereby corrected as shown below:

COLUMN 7

Line 20, "such" should read --such a--;
   Line 23, "dimensionally" should read --dimension--;
   Line 46, "an" should read --one--;
   Line 57, "performs" should read --perform--.

COLUMN 8

Line 58, before "coding" insert --d)-- and "transfored" should read --transformed--.

Signed and Sealed this

Twenty-seventh Day of January, 1998

Attest:

BRUCE LEHMAN

*Attesting Officer*      *Commissioner of Patents and Trademarks*